(12) United States Patent
Valegerepura et al.

(10) Patent No.: US 11,347,820 B2
(45) Date of Patent: May 31, 2022

(54) FACILITATING IDENTIFICATION OF AN INTENDED COUNTRY ASSOCIATED WITH A QUERY

(71) Applicant: MICROSOFT TECHNOLOGY LICENSING, LLC, Redmond, WA (US)

(72) Inventors: Kumarswamy Valegerepura, Redmond, WA (US); Minghui Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 796 days.

(21) Appl. No.: 15/953,118

(22) Filed: Apr. 13, 2018

(65) Prior Publication Data

US 2019/0318014 A1    Oct. 17, 2019

(51) Int. Cl.
| | |
|---|---|
| *G06F 16/9537* | (2019.01) |
| *G06N 20/00* | (2019.01) |
| *G06F 16/29* | (2019.01) |
| *G06F 16/22* | (2019.01) |
| *G06F 16/9038* | (2019.01) |
| *G06F 16/9032* | (2019.01) |

(52) U.S. Cl.
CPC ...... *G06F 16/9537* (2019.01); *G06F 16/2246* (2019.01); *G06F 16/29* (2019.01); *G06F 16/9038* (2019.01); *G06F 16/90324* (2019.01); *G06N 20/00* (2019.01)

(58) Field of Classification Search
CPC ............... G06F 16/29; G06F 16/9537; G06F 16/90324; G06F 16/2246; G06F 16/9038; G06N 5/022; G06N 5/003; G06N 20/00; G06N 20/20; G06N 7/005; G06N 3/006
See application file for complete search history.

(56) References Cited

U.S. PATENT DOCUMENTS

| | | | |
|---|---|---|---|
| 8,538,956 B1 * | 9/2013 | Szabadka | G06F 16/29 707/724 |
| 9,338,594 B1 * | 5/2016 | Onnen | H04W 4/027 |
| 9,922,344 B1 * | 3/2018 | Christophe | G06Q 30/0256 |
| 10,229,680 B1 * | 3/2019 | Gillespie | G06F 40/295 |
| 2007/0015119 A1 * | 1/2007 | Atenasio | G09B 29/106 434/130 |
| 2008/0028429 A1 * | 1/2008 | Nakamura | H04N 5/50 725/72 |

(Continued)

*Primary Examiner* — Etienne P Leroux
(74) *Attorney, Agent, or Firm* — Ray Quinney & Nebeker P.C.; Paul N. Taylor

(57) ABSTRACT

Aspects of the technology described herein are directed towards, among other things, identifying a country(s) likely intended in association with a query. In embodiments, a query is analyzed to identify a set of place entities that each indicate a specific location and a set of location labels that each indicate an aspect of a location. Additionally, map view data is analyzed to identify a set of location candidates that each indicate a country presented within a map view. The map view data indicates at least a portion of a boundary of the map view. Thereafter, a machine learned model is used to identify a set of countries likely to be intended in association with the query based on the set of place entities, the set of location labels, and the set of location candidates. The set of countries can be provided for use in identifying information related to the query.

20 Claims, 8 Drawing Sheets

(56) References Cited

U.S. PATENT DOCUMENTS

2010/0211566 A1\* 8/2010 Ghanekar ........... G06F 16/9537
  707/724
2016/0350426 A1\* 12/2016 Wu ..................... G06F 16/3322
2017/0060856 A1\* 3/2017 Turtle ..................... G06F 16/93

\* cited by examiner

FACILITATING IDENTIFICATION OF AN INTENDED COUNTRY ASSOCIATED WITH A QUERY

BACKGROUND

Geocoding is the process of transforming an address description to a location on the Earth's surface. Typically, to properly perform geocoding, identifying a country associated with a query is useful. For example, because so many addresses exist around the world, data is often partitioned and searched by country. Further, as each country has a unique way to describe an address, the query processing logic can be specific to a country. Accurately identifying a country intended to be associated with a query, however, can be difficult, particularly in cases in which an ambiguous query is provided (e.g., via a free form query). By way of example only, a query of "161 Paris Dr" may be identified as a query corresponding with the country France based on use of the term "Paris," when another country may in fact be intended in association with the query. Inaccurately identifying a country in association with a query can result in both a decreased user experience and a decreased processing efficiency.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Because of the extensive number of addresses that exist in the world, country specific geocoders are oftentimes utilized. As such, the geocoding of an address is more efficient if the geocoder for the intended country of the address query is determined or a list of highly probable intended countries of the address query is determined. As such, aspects of the technology described herein are directed towards systems, methods, and computer storage media for, among other things, identifying a location(s), such as a country, likely intended to correspond with a query. In implementation, various location signals can be identified, such as, for example, place entity signals, location label signals, location candidate signals, and user location. Such signals can be converted to features that can be applied to a machine learned model to produce a set of intended locations associated with a query.

BRIEF DESCRIPTION OF THE DRAWINGS

Aspects of the invention are described in detail below with reference to the attached drawing figures, wherein.

DETAILED DESCRIPTION

Figure 1:
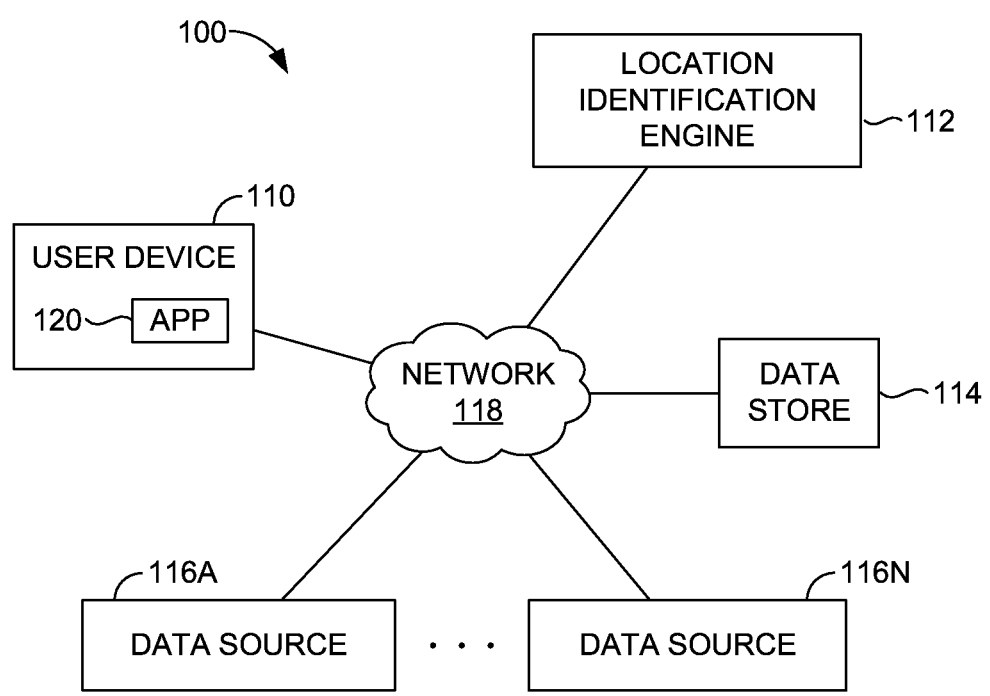
FIG. 1 is a block diagram of an example operating environment suitable for implementing aspects of the technology.

The subject matter of aspects of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In accordance with inputting a query, users generally desire and expect search results or information relevant to the input query. In many cases, queries are related to a geographical location. Accordingly, users typically desire and expect search results or information related to the geographical location. For example, a user may desire to see a relevant map, nearby locations, or other search results related to the geographical location.

To provide relevant information, a location intended in association with the query is generally identified. As one example, a country intended in association with a query is identified and utilized to call an appropriate geocoder that provides geographical coordinates to a location on the Earth's surface. For example, in analyzing a query and identifying the United States as corresponding to an input query, a United States geocoder can identify a set of geographical coordinates within the United States. Such geographical coordinates can then be used to provide relevant information, for example, via a map or search results.

In conventional systems, an intended country of a query is determined using a voting system. In particular, votes can be determined based on words of places in a query, a single point in the center of a map view, and a location of a user. A country with the most votes is determined to be the intended country of the query. By way of example only, each country which contains a particular location (e.g., Richmond) receives a single vote as the intended country of the query (e.g., the United States receives a single vote and Canada receives a single vote). Further, a country associated with a single point in the center of a map view may also receive a vote as the intended country of the query. Finally, a country associated with a location of the user can also receive a vote as the intended country of the query. The country with the most votes is determined to be the intended country of the query.

Such a conventional approach, however, can lead to many inaccurate returned results, particularly in response to ambiguous queries. That is, incorrect or unnecessary additional countries may be determined as intended in association with a query. For instance, this conventional approach treats all votes as having the same influence on selecting the intended country associated with a query. Utilizing an equal voting approach may result in a country incorrectly identified as relevant to a query. As a particular example, a query of "123 Paris Drive" may result in France being incorrectly identified as the intended country based on extraction of the term "Paris." As another example, assume a center of a map view is located in Washington, even though both Washington state and Canada are presented in the map view. Utilizing only the center point of the map view may provide a vote for Washington resulting in the United States identified as an intended country, while Canada may in actuality be the country intended to correspond with the query.

Inaccurately identifying a country intended in association with a query can result in unsatisfactory information being provided to a user. For instance, a user may be provided with a map or search results associated with an undesired country. As another example, when multiple countries are identified, search results associated with the various countries may be merged thereby providing irrelevant, or difficult to navigate, information to a user. In addition to providing unsatisfactory information, identifying incorrect countries and/or identifying too many countries can impact system performance. For instance, in cases where multiple countries are identified as having possible relevance to a query, multiple calls to the corresponding geocoders may be made, some of which may be unnecessary. In addition to unnecessary processing at the geocoder, superfluous processing may be performed to aggregate all the results, many of which may be irrelevant.

Accordingly, aspects of the technology described herein are directed towards, among other things, facilitating identification of an intended country(s) associated with a query. In particular, machine learning is utilized to identify a country(s) most likely intended to correspond with an input query. In this regard, a machine learned model, trained using historical data, can produce a list of intended countries associated with a query based on probabilities that such countries are the intended country of the query. In some cases, a single country may be identified (e.g., a country having a 75% probability as being intended). In other cases, multiple countries may be identified (e.g., a country having a 40% probability of being intended and a country having a 35% probability of being intended).

Various location signals can be obtained and used in association with a machine learned model to identify a relevant country or set of countries. Such location signals can include, for example, a set of place entities associated with a query, a set of location labels associated with the query, a set of location candidates based on a map view, and a user location. As can be appreciated, the location signals can be weighted to emphasize or deemphasize various signals. For example, a user location within proximity of a location candidate identified via a map view may have a higher weight than a user location not within proximity of a location candidate. As another example, a location candidate within a map view having many countries may have a lower weight than a location candidate within a map view having only one or two countries.

In implementation, and at a high level, location signals can be obtained in accordance with an input query, location indicator (e.g., IP address or GPS coordinate), and/or map view data (e.g., coordinates associated with a map view presented via the display). By way of example only, assume a query of "123 Paris Drive, Richmond Wash." is received, along with an IP address, and a set of map view coordinates. Such information can be used to identify various location signals (also referred to herein as signals). In particular, place entity signals can be extracted from the query. For instance, "Paris" and "Richmond" can be extracted from the query to represent various locations. In some cases, upon comparing Paris and Richmond to an index, the countries of France, United States, and Canada may be identified as place entities as corresponding with the terms "Paris" and "Richmond." Location label signals can also be identified in association with the query. Location labels generally refer to different aspects of a location. For instance, with the query "123 Paris Drive, Richmond Wash.," "123 Paris Drive" can be identified as a street address location label, "Richmond" can be identified as a city location label, and "WA" can be identified as a state location label. Location labels can be predicted for a sequence of tokens from a query by applying Conditional Random Fields (CRFs) to the tokens. Location candidate signals can be identified based on the map view data. In one embodiment, map view data indicating the coordinates of the map view may be used in association with an index of country polygon coordinates to identify which country(s) appears in the map view provided to a user. Finally, a user location signal can be identified, for instance, based on an IP address or GPS location.

The various location signals can be converted to features, such as a vector, for use in identifying an intended country(s) corresponding with the query. That is, the features can be applied to a machine learning model to predict a country or set of countries likely intended in association with the query. Such identified countries can then be used to identify relevant data. For example, assume a country of the United States is identified as a likely intended country. In such a case, a call can be made to the United States geocoder to obtain data, such as a geographical coordinate. Further, and as described herein, in some cases, where multiple countries are identified as likely intended countries corresponding with the query, such countries may be provided to a user via a user interface to enable the user to select or confirm which country is intended or desired.

Utilizing the approach and various location signals described herein can facilitate an improved accuracy of identifying a country likely intended to correspond with an input query. Further, in improving accuracy of identifying a country likely intended in association with a query, the processing time for identifying relevant information is reduced. For example, a number of calls made to country geocoders may be reduced and, as a result, processing and storing search results related to multiple countries may be reduced.

Referring now to FIG. 1, a block diagram of an exemplary network environment 100 suitable for use in implementing embodiments of the invention is shown. Generally, the system 100 illustrates an environment suitable for facilitating identification of an intended country(s) associated with a query by, among other things, using location signals. The network environment 100 includes a user device 110, a location identification engine 112, a data store 114, and data sources 116a-116n (referred to generally as data source(s) 116). The user device 110, the location identification engine 112, the data store 114, and the data sources 116a-116n can communicate through a network 118, which may include any number of networks such as, for example, a local area network (LAN), a wide area network (WAN), the Internet, a cellular network, a peer-to-peer (P2P) network, a mobile network, or a combination of networks. The network environment 100 shown in FIG. 1 is an example of one suitable network environment and is not intended to suggest any limitation as to the scope of use or functionality of embodiments of the inventions disclosed throughout this document.

Neither should the exemplary network environment 100 be interpreted as having any dependency or requirement related to any single component or combination of components illustrated therein. For example, the user device 110 and data sources 116a-116n may be in communication with the location identification engine 112 via a mobile network or the Internet, and the location identification engine 112 may be in communication with data store 114 via a local area network. Further, although the environment 100 is illustrated with a network, one or more of the components may directly communicate with one another, for example, via HDMI (high-definition multimedia interface), DVI (digital visual interface), etc. Alternatively, one or more components may be integrated with one another, for example, at least a portion of the location identification engine 112 and/or data store 114 may be integrated with the user device 110. For instance, a portion of the location identification engine 312 may be configured to identify a portion of location signals, while the user device may be configured to identify another set of location signals.

The user device 110 can be any kind of computing device capable of facilitating identification of an intended country(s) associated with a query. For example, in an embodiment, the user device 110 can be a computing device such as computing device 700, as described above with reference to FIG. 7. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating a location or country(s) identification. In some implementations, the application(s) comprises a web application, which can run in a web browser, and could be hosted at least partially server-side. In addition, or instead, the application(s) can comprise a dedicated application. In some cases, the application is integrated into the operating system (e.g., as a service).

In embodiments, location identifications may be initiated and/or presented via an application 120 operating on the user device 110. In this regard, the user device 110, via an application 120, might allow a user to provide a query and to initiate, in response to providing a query, an identification of a set of countries intended to correspond with the query. The user device 110 can include any type of application that facilitates location or country identification. An application may be a stand-alone application, a mobile application, a web application, or the like. In some cases, the functionality described herein may be integrated directly with an application or may be an add-on, or plug-in, to an application.

User device 110 can be a client device on a client-side of operating environment 100, while location identification engine 112 can be on a server-side of operating environment 100. Location identification engine 112 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of location identification engine 112 and user device 110 to remain as separate entities.

In an embodiment, the user device 110 is separate and distinct from the location identification engine 112, the data store 114, and the data sources 116 illustrated in FIG. 1. In another embodiment, the user device 110 is integrated with one or more illustrated components. For instance, the user device 110 may incorporate functionality described in relation to the location identification engine 112. For clarity of explanation, we will describe embodiments in which the user device 110, the location identification engine 112, the data store 114, and the data sources 116 are separate, while understanding that this may not be the case in various configurations contemplated within the present invention.

As described, location identification refers to identifying a location (e.g., country) likely intended to correspond with a query. As generally described in embodiments herein, location identification identifies a country(s) likely intended in association with a query. Location identification, or country identification, is oftentimes desired to improve search results, or information associated therewith. For instance, in cases that an input query may be ambiguous as to a location, information or search results associated with multiple locations may be provided. However, with appropriate identification of a desired or intended country, search results or information more relevant to the identified country can be provided to the user, thereby increasing the overall user experience. By way of example only, upon accurately identifying an intended country associated with a particular query, an appropriate geocoder can be called to provide a geographic location. With an appropriate geographic location, various information more relevant to a user can be provided. Although location identification is generally discussed herein in relation to identifying a country intended to correspond with a query, another location area (e.g., state, city, and continent) may be identified in embodiments.

Identification of such location identification may be initiated at the user device 110 in any manner, for instance, upon inputting a query, for example, by a user via a search box on the user interface or selection of an object (e.g., text) presented on the user interface. By way of example only, a user might input a search query into a search box. As another example, a search might be automatically initiated, for instance, upon selection of text options, etc. A query can be input or selected in any number of ways. For instance, a user might use a mouse, selector, touch input, or the like to input or select a query. As another example, a query might be automatically selected.

A query can be provided to the location identification engine 112 for use in identifying a location, such as a country. In addition to providing a query to the location identification engine 112, additional location indicators and/or map view data may be provided in association with, or as part of, a query to initiate a location identification process. For instance, an indication of a user location, such as an IP address and/or GPS coordinates, may be provided along with a query. By way of example only, upon inputting a query as well as a "search" or "go" button or icon, the query and an IP address/GPS coordinates can be provided to the location identification engine 112 for use in identifying a location intended to correspond with the query. As another example, map view data, such as coordinates corresponding with the map presented to the user, may be provided along with a query.

The user device 110 communicates with the identification location engine 112 to facilitate identification of a location, such as a country, likely intended to correspond with a search query. In embodiments, for example, a user utilizes the user device 110 to initiate a search, for example, for related information via the network 118. For instance, in some embodiments, the network 118 might be the Internet, and the user device 110 interacts with the location identification engine 112 to identify a country relevant to a particular query. In other embodiments, for example, the network 118 might be an enterprise network associated with an organization. It should be apparent to those having skill in the relevant arts that any number of other implementation scenarios may be possible as well.

With continued reference to FIG. 1, the location identification engine 112 generally provides indications of predicted geographical locations, such as countries, identified as likely to be intended in relation to the query. Generally, the location identification engine 112 analyzes a set of location signals or data to identify a set of one or more countries likely intended in association with the query. The identified country or set of countries can be provided to the user device 110 and/or used to identify or search for relevant data, as described in more detail below. The location identification engine 112, according to embodiments, can be implemented as server systems, program modules, virtual machines, components of a server or servers, networks, and the like.

In embodiments, the location identification engine 112 receives queries initiated via the user device 210. Queries initiated at a user device, such as user device 110, can include queries that were manually or explicitly input by the user (input queries) as well as queries that were automatically generated. Generally, the location identification engine 112 can receive queries from any number of devices, including user devices, servers (e.g., search engines), or the like.

In accordance with receiving a query (e.g., via the user device 110 or a search engine) and any location indicators and/or map view data, the location identification engine 112 can analyze the data to identify or generate location signals. As described, a location signal refers to an indicator or signal indicating a location, such as a country. Location signals may include, for example, a user location, location labels, location candidates, place entities, or information associated therewith. As described, to identify an intended location, the location identification engine 112 may identify a set of location signals and, thereafter, utilize the location signals to identify an intended country associated with a query.

Upon identifying an intended country(s) associated with a query, the identified country may be utilized to generate relevant search results. For example, in some embodiments, the identified country(s) may be provided to a search engine and/or geocoder to generate search results or data (e.g., geographical coordinates) relevant to the query in association with the identified country. Additionally or alternatively, an indication of the identified country(s) may be provided to the user device 110 for presentation to the user. In some cases, the user may confirm or validate a location (e.g., country) as the intended location associated with the query. As one example, a single identified country may be presented to a user via a user interface for confirmation of an intended country to associate with the query. Upon confirmation, relevant information associated therewith may be updated or generated based on the confirmation. As another example, in some cases, multiple countries may be identified with associated probabilities. For example, a first country with a 40% likelihood of intent and a second country with a 30% likelihood of intent may be identified. In such a case, instead of assuming the first country is intended, both the first and second country may be provided to the user device for presentation as a potential or candidate intended country. In such a case, a user may select the desired country, which can then be used to provide relevant information.

Figure 2A:
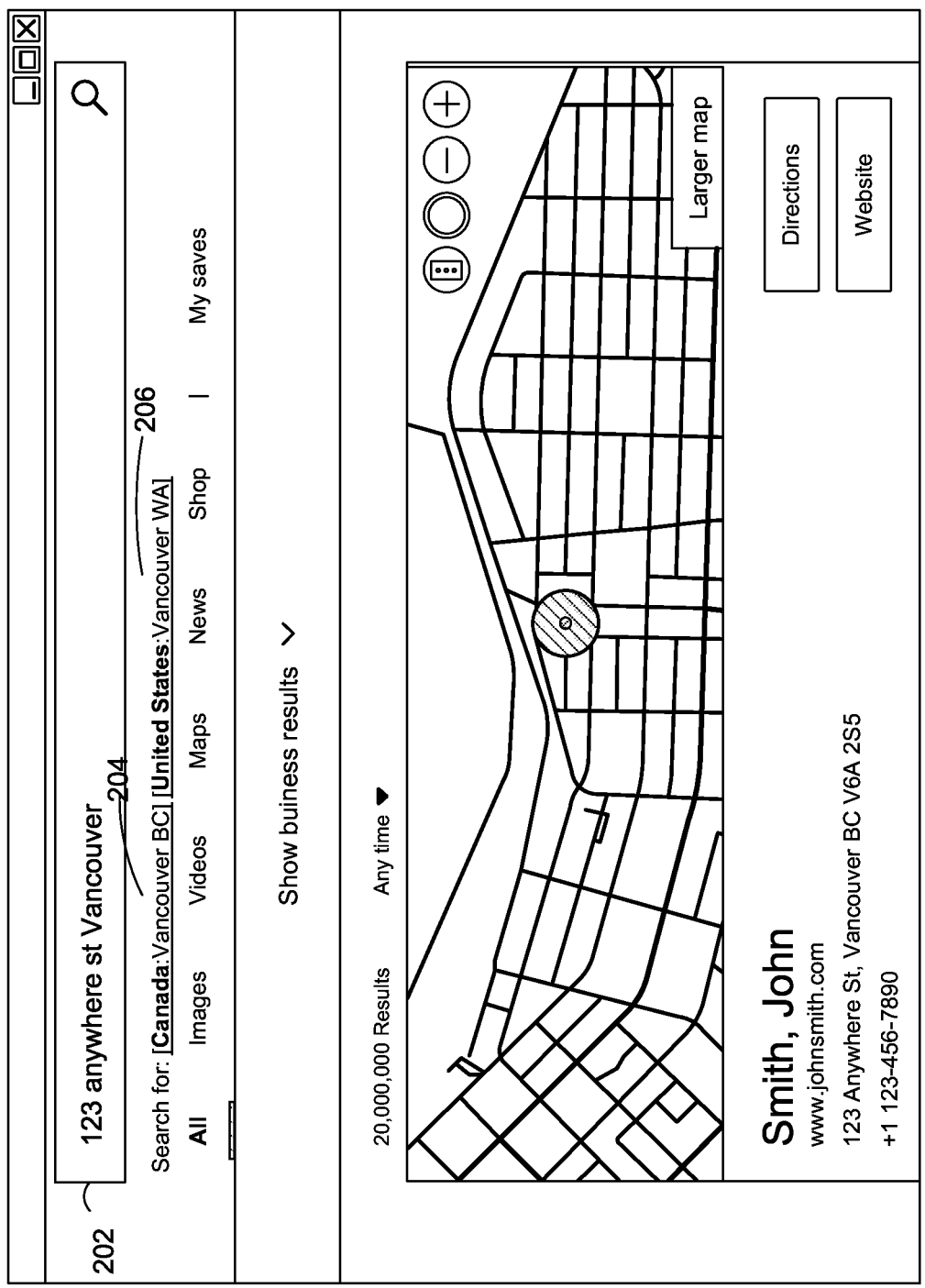
FIGS. 2A-2B illustrate exemplary graphical user interfaces that present candidate query rewrite suggestions, in accordance with an aspect of the technology.
Figure 2B:
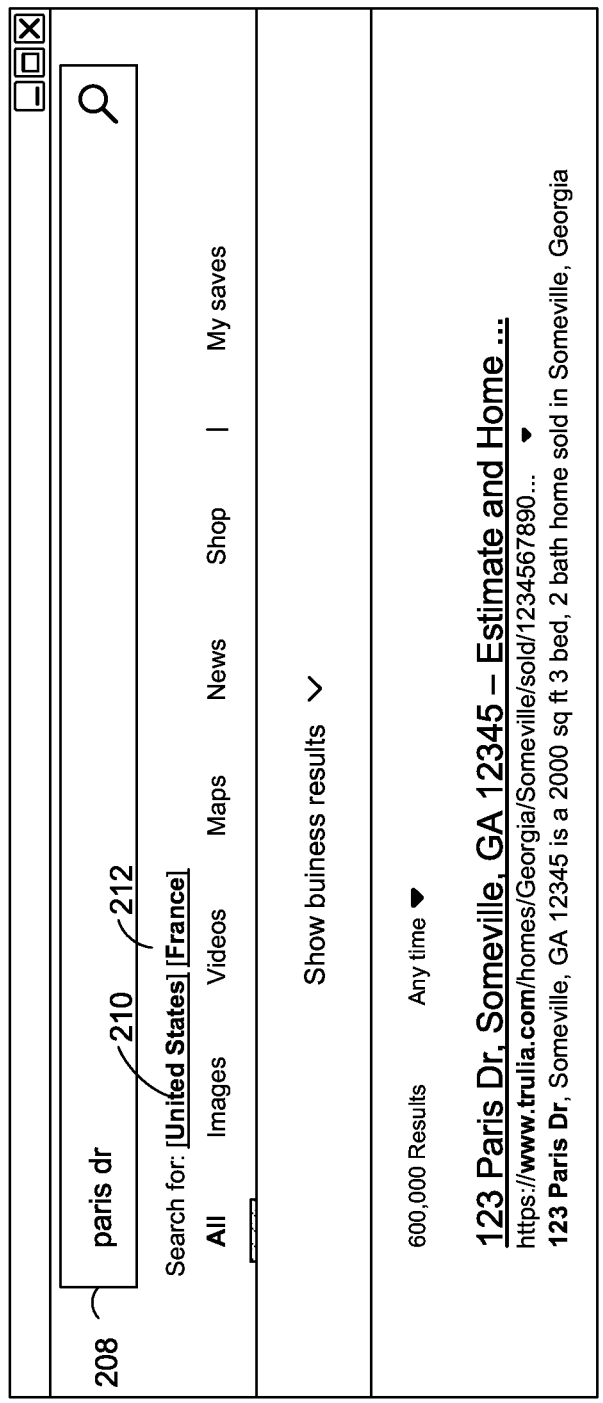

By way of example only, and with reference to FIGS. 2A-2B, FIG. 2 illustrates an example user interface 200 presenting indications of identified locations. Assume a user inputs a query "123 main st Vancouver," into a search box 202. Now assume that based on location signals, for example derived from the search query, location data, map view data, etc., the countries identified as most likely countries of interest include Canada and the United States. In such a case, candidate query rewrite suggestions 204 and 206 can be provided. As another example, and with respect to FIG. 2B, assume a user inputs a query "paris dr" in search box 208 and the user is identified as being currently positioned in the United States. Now assume that based on location signals, for example derived from the search query, user location, map view, etc., the countries identified as most likely countries of interest include the United States and France. Accordingly, candidate query rewrite suggestions 210 and 212 can be presented. Upon a user selecting one of rewrite suggestions 210 or 212, the search results may be refined to provide more relevant search results. Such query suggestions can be represented in any manner. This is only one example of potential user interface aspects of embodiments of the present invention and is not intended to limit the scope of the invention.

Figure 3:
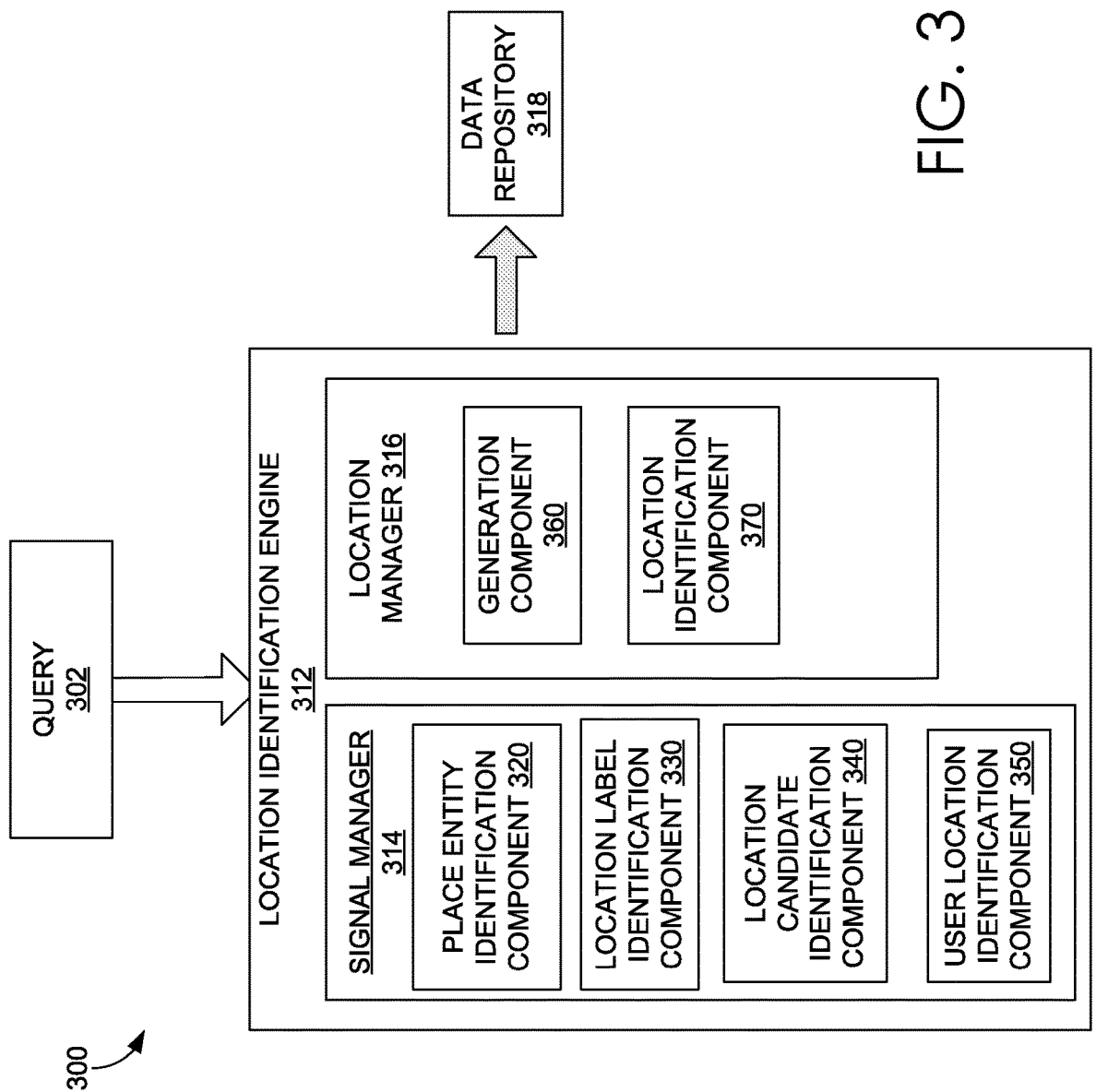
FIG. 3 is a diagram depicting an example computing architecture suitable for implementing aspects of the technology.

Turning now to FIG. 3, FIG. 3 illustrates an example location identification engine 312. In one aspect, the functions performed by components of system 300 are associated with one or more personal assistant applications, virtual assistants, services, or routines. In particular, such applications, virtual assistants, services, or routines may operate on one or more user devices, servers, may be distributed across one or more user devices and servers, or be implemented in the cloud. Moreover, in some aspects, these components of system 300 may be distributed across a network, including one or more servers and client devices, in the cloud, or may reside on a user device such as user device. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 300, it is contemplated that in some aspects functionality of these components can be shared or distributed across other components.

In embodiments, the location identification engine 312 includes a signal manager 314 and a location manager 316. According to embodiments of the invention, the location identification engine 312 can include any number of other components not illustrated. In some embodiments, one or more of the illustrated components 314 and 316 can be integrated into a single component or can be divided into a number of different components. Components 314 and 316 can be implemented on any number of machines and can be integrated, as desired, with any number of other functionalities or services. By way of example only, location manager 316 may operate at a server, while signal manager 314, or aspects thereof, may operate at a user device.

The location identification engine 312 can communicate with the data repository 318. The data repository 318 is configured to store various types of information used by the location identification engine 312. In embodiments, the location identification engine 312 provides data to the data repository 318 for storage, which may be retrieved or referenced by the location identification engine 312. Examples of types of information stored in data repository 318 may include, for example, location signals, queries, map view data, location indicators, indices, or the like.

The signal manager 314 is generally configured to identify, determine, or generate location signals. As shown in FIG. 3, the signal manager 314 may include place entity identification component 320, a location label identification component 330, a location candidate identification component 340, and a user location identification component 350. In implementation, the signal manager 314 can receive as input a query 302 for which an intended country identification is to be performed. As previously described, such a query can be input by a user via a user device or automatically selected. Further, a location indicator(s) (e.g., IP address, GPS data) and/or map view data (e.g., coordinates associated with a presented map view) may also be obtained (e.g., provided by the user device). In some cases, the query 302 and corresponding data (location indicators or map view data) may be received directly from the user device. In other cases, the query 302 and corresponding data can be received from a search engine, for example, that received such information from the user device.

The components illustrated within the signal manager 314 can utilize obtained information and identify, determine, or generate various location signals. As can be appreciated, any number of components may be used to generate such location signals, and these specific components are provided for illustration purposes only. The illustrated components may be embodied as a set of compiled computer instructions or functions, program modules, computer software services, or an arrangement of processes carried out on one or more computer systems, such as computing device 700 described in connection to FIG. 7, for example.

Continuing with FIG. 3, the place entity identification component 320 is generally configured to identify place entity signals associated with a query. A place entity refers to a term or phrase that indicates a location or place. For instance, a place entity may specify a particular country, state, city, address, neighborhood, or the like. By way of example only, assume a query "123 Paris Dr Richmond Wash." is obtained. In such a case, a first country entity may be "France" based on the term "Paris," a second country entity may be "United States" based on "Richmond" and "WA.," and a third country entity may be "Canada" based on "Richmond."

In some implementations, the place entity identification component 320 may scan a query and extract tokens from the query. The tokens can then be analyzed to identify any place entities. By way of example only, a query can be parsed to generate a set of tokens. A determination can then be made as to whether any tokens are place entities. For instance, the query tokens can be compared to tokens or words in a place index. The place index refers to an index of tokens that indicate a place or geographical location in the world (e.g., city, state, country, address). When the query tokens matches or corresponds with a token in the place index, the token can be identified as a place entity signal. By way of example only, a "Richmond" token may match a "Richmond" token in a place index. In such a case, "Richmond" may be identified as a place entity associated with the query. As another example, "Richmond" token may match a "Richmond" token(s) in a place index that corresponds with the countries of the United States and Canada. In this case, "United States" and "Canada" may be identified as a place entity associated with the query.

The location label identification component 330 is generally configured to determine location label signals for one or more tokens in the query. A location label refers to a label or tag that indicates an aspect or part of a location. A location label may be, for example, a city label, a state label, a street label, a country label, a zip code label, etc. Accordingly, various aspects of a query may be labeled with different location labels. By way of example only, assume a query entered is "123 Paris Drive Richmond Wash." In such a case, the location label identification component 330 may designate a street address label for "123 Paris Drive," a city label for "Vancouver," and a state label for "wa." Any number or type of labels may be identified, and embodiments described herein are not intended to be limited to any particular location labels.

Identifying location labels associated with tokens, or a set of tokens, in a query can occur in any number of manners. In one embodiment, CRFs can be utilized to determine location labels for tokens or sets of tokens in a query. CRFs are generally applied in pattern recognition and machine learning for structured prediction. Advantageously, utilization of CFRs enables context of the query to be taken into account. Although conditional random fields are described herein, as can be appreciated, other techniques, including other statistical modeling techniques, may be employed to identify location labels.

In performing a CRFs technique, the location label identification component 330 can utilize a set of location rules to identify location labels. Location rules can be any rules that indicate location labels. For example, a location rule may indicate that a token or set of tokens corresponds with an address line, a city, a state, a country, or the like. As can be appreciated, any number of location rules may exist for a particular location attribute (e.g., address line, city) For instance, many rules that indicate an address line might be utilized. One rule may include that use of the term "drive" or "dr" indicates an address line and that numerals preceding that term are also part of the address line. Similarly, another rule may include that use of the term "street" or "st" indicates an address line and that numerals preceding that term are also part of the address line. As another example, many rules that indicate a city might be utilized. One rule may indicate that a token presented subsequent to the term "drive" or "dr" is to be designated a city label, while another rule may indicate that a token presented subsequent to the term "street" or "st" is to be designated a city label. Further, as can be appreciated, various rules may be applicable in accordance with different languages or countries.

In implementation, a query can be analyzed to identify a set of location labels for the query based on location rules. The location rules can be generated in any number of ways, or accessed from any number of sources. The location label identification component 330 can predict location label types for a sequence of tokens from a query by applying CRFs to the sequence of one or more tokens from the query. The CRFs are trained from location rules and can use pattern recognition probability models to determine the probability that a sequence of one or more tokens from the query corresponds with a particular location label. In accordance with identifying a token or set of tokens that correspond with a particular location label (e.g., country), the token(s) can be designated, labeled, or tagged as such. The location tags can then be used as location signals for identifying a location (e.g., country) likely intended in association with the query.

The location candidate identification component 340 is generally configured to identify location candidate signals. A location candidate refers to a location (e.g., country) that is identified as a candidate based on a map view presented to a user. A map view generally refers to a view of a map that is presented to a user, for example, that provided a query for which a likely intended country is being analyzed. In this regard, a map view can be the bounded map area presented. A map view can be designated in any number of ways, such as geographical coordinates associated with any number of corners or other boundaries of the map.

Identifying a location, such as a country, that is included in a map view can be performed in any number of ways. In one implementation, to determine an identification of a country that is in a map view, map view data is received. As previously described, map view data can refer to any data indicating a map view presented via a display screen to a user. By way of example only, map view data may include geographical coordinates indicating the map view presented. Such geographical coordinates may represent any number of aspects of the map view. For instance, geographical coordinates may represent any number (e.g., 1, 2, 3, or 4) of corners of the map view presented to a user. As can be appreciated, in embodiments, such a map view indicator may be received in association with the query. Further, in embodiments in which a map is not presented to a user, a map view indicator may not be received.

The map view data can be set from the default map of the browser, set by a user of the browser, set by a change in the current map view of the browser, or set by an application. By way of example only, a user located in Washington state may initially be presented with a map view including the state of Washington and portions of Canada. As such, initial map view data may include coordinates associated with 4 corners of the map view that includes Washington and portions of Canada. A user may navigate the map upward such that only portions of Washington and Oregon are presented. In such a case, map view data might be updated to include the coordinates associated with four corners of the map view that includes the portions of Washington and Oregon.

The map view data, or some derivation thereof (bounding polygon, etc.), can be compared to an index of location polygons (e.g., country polygons) to identify a set of locations (e.g., countries) in the map view. In some embodiments, an index of location polygons may be a set of polygons that define the shape of the locations, such as counties (e.g., via geographical coordinates defining boundaries of the countries). An index of location polygons may be in the form of an R-Tree. An R-Tree is a tree data structure used for indexing multi-dimensional information such as geographical coordinates, rectangles, or polygons. In this regard, an R-tree may include all country polygons built into a tree. Such an R-tree may be built using geographical data associated with countries. Advantageously, in such a case, because the location polygons have been indexed by an R-tree, a faster determination of candidate countries can result as the process utilizes an index instead of looking into a flat database file for coordinates of overlapping countries.

The map candidates can be found by determining one or more intersections between the map view and the location polygons in the index of geographical coordinates associated with locations of countries. The resulting countries of the intersections can be designated as location candidate signals.

In addition to location signals including location candidates, the location candidate identification component 340 can also determine other signals, such as probabilities or weights associated with the location candidates. For example, a map view showing a proportionally large number of countries may be less valuable for determining an intended location. To this end, the more countries that are detected as a map view candidate, the lower the weights may be associated with such candidates.

The user location identification component 350 is generally configured to determine a user location signal associated with the user. The user location can be determined, for example, using GPS, the location of the IP address of the device associated with the user, or any other manner known in the art. The user location identification component 350 may indicate the user location via longitude and latitude coordinates. The user location can then be identified as a location signal. As can be appreciated, the user location identification component 350 may determine weights or probabilities in addition to or in association with the identified user location(s). For example, a first weight might be applied to a user location generated via reverse IP lookup, while a second weight might be applied to a user location generated via GPS.

Although specific location signals are described in relation to components of the signal manager 314, any additional or alternative signals may be employed in accordance with various embodiments of the present technology.

Turning now to the location manager 316, the location manager 316 is generally configured to utilize the location signals to identify locations (e.g., countries) likely intended in association with queries. As shown in FIG. 3, the location manager 316 may include feature generation component 360 and location identification component 370. As can be appreciated, any number of components may be used to identify intended locations, and these specific components are provided for illustration purposes only. The illustrated components may be embodied as a set of compiled computer instructions or functions, program modules, computer software services, or an arrangement of processes carried out on one or more computer systems, such as computing device 700 described in connection to FIG. 7, for example.

Feature generation component 360 is generally configured to generate location features based on the location signals. In embodiments, the feature generation component 360 obtains various location signals, for example generated from the place entity identification component 320, the location label identification component 330, the location candidate identification component 340, and the user location identification component 350. Generally, the feature generation component 360 normalizes location signals into a feature form (e.g., via conversion). A feature form may be, but is not limited to, a number, a number vector, a value, and/or confidence score.

The location identification component 370 generally identifies a location, or set of locations, likely intended in association with a query. In particular, a location or set of locations likely intended in association with a query can be determined or identified by analyzing the location features using a machine learned model. The machine learned model can output a set of one or more locations identified as likely intended in association with a query. In embodiments, the machine learned model can provide probabilities that the query corresponds with a particular location, such as a country.

In some cases, probabilities associated with identified locations (e.g., countries) can be used to select a specific location(s). For example, assume a first country is identified with a 0.8 probability that the country was intended in association with a query. In such a case, the first country may be selected. As another example, assume a first country and a second country are identified with 0.4 and 0.3 probabilities, respectively, that the countries were intended in association with the query. In such a case, the first and second countries may be selected. In some embodiments, a threshold value may be used to select a location or location set. For instance, countries associated with a probability above a threshold value may be selected. In other instances, countries having probabilities within a threshold value from one another may be selected.

The identified or selected locations can then be used to provide relevant information. For instance, calls can be made to geocoders associated with the identified locations. In some cases, upon identifying or selecting locations, such locations can be provided to a user to obtain confirmation or verification of a desired location. In this regard, a user may be provided with candidate query rewrite suggestions that incorporate the identified locations (e.g., countries). For example, when multiple locations are identified as possible locations of interest (e.g., exceeding a threshold or within a threshold from one another), the multiple locations may be provided via a user interface.

The machine learned model used to identify an intended location corresponding with a query may be trained in any number of ways. For instance, a machine learned model may be trained using supervised learning (e.g., decision tree, random forest, logistic regression), unsupervised learning (e.g., apriori algorithm, K-means), or reinforcement learning. In training a machine learned model, historical queries and features associated therewith can be used as inputs to determine the probability of the intended countries of the historical queries.

For example, with supervised learning processes, historical queries and features associated with the historical queries can be used as the example data, and the intended countries of the historical queries can be used as the associated target response data. The historical queries and the features associated with the historical queries can be used to train a function (different supervised learning processes can use different functions) to map the historical queries to the intended countries of the historical address queries. In this way, the function should predict the desired outcome (i.e., predict intended countries of an address query) given a similar address query and features as the inputs. The historical queries and features associated with the historical queries can be preprocessed to fit a schema that can be used to input data to the function during both training and use.

With unsupervised learning processes, historical queries and features associated with the historical queries can be used as the example data for training. In this way, the predicted desired outcome (i.e., predicted intended countries of a query) can be based on the output from similar groups of queries and features. With reinforcement learning, the machine is trained to make specific decisions, such as select predicted intended countries of a query. In reinforcement learning, the machine can train itself with trial and error using historical queries and features associated therewith. While different machine-learning processes can be used, including different processes for different query types or data environments, the various processes can use historical query data from a search engine.

Figure 4:
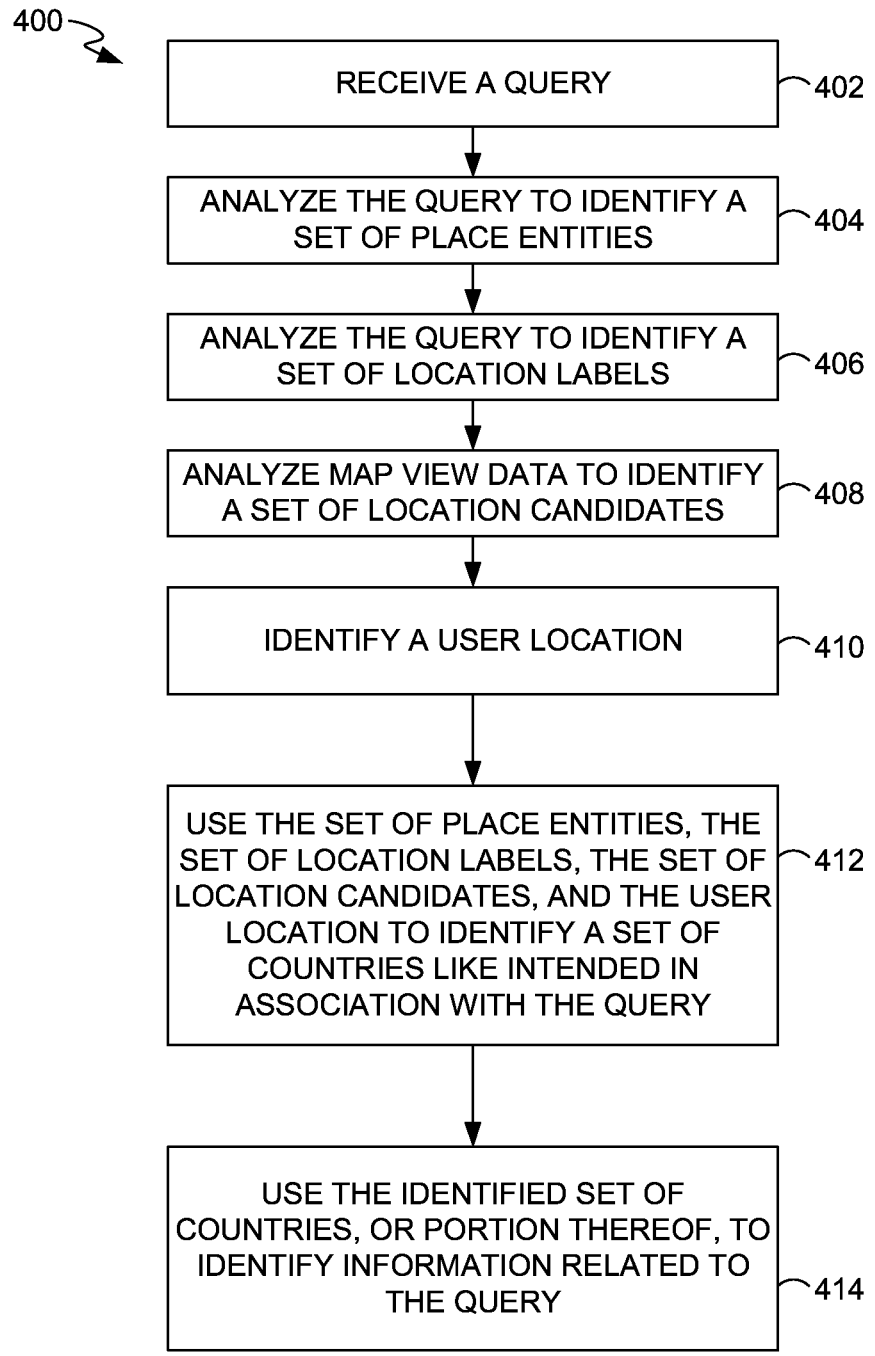
FIG. 4 depicts a flow diagram of a method for determining the predicted country associated with a query, in accordance with an aspect of the technology.

Turning now to FIG. 4, a flow diagram is provided illustrating one example method 400 for determining the predicted country associated with a query. Each block or step of method 400 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Initially, at block 402, a query is received. The query can be input by a user via a user device. At block 404, the query is analyzed to identify a set of place entities. Such place entities indicate a specific location, such as a name of a city, a name of a state, a name of a country, etc. At block 406, the query is analyzed to identify a set of location labels. The location labels can specify an aspect of a location, such as this first portion or set of tokens correspond to a street address and this second portion or set of tokens correspond to a city. At block 408, map view data is analyzed to identify a set of location candidates. The map view data can be received in association with the query. In embodiments, the map view data indicates at least a portion of a boundary of the map view that is presented to the user. For example, map view data may comprise coordinates associated with one or more corners of the map view. At block 410, a user location is identified. Thereafter, at block 412, the set of place entities, the set of location labels, the set of location candidates, and the user location can be used by a machine learned model to identify a set of countries likely intended in association with the query. In embodiments, such place entities, location labels, location candidates, and user location can be normalized into a set of features for application to the machine learned model. At block 414, the identified set of countries, or portion thereof, can be used to identify information related to the query. For example, calls to each geocoder associated with the identified set of countries can be executed.

Figure 5:
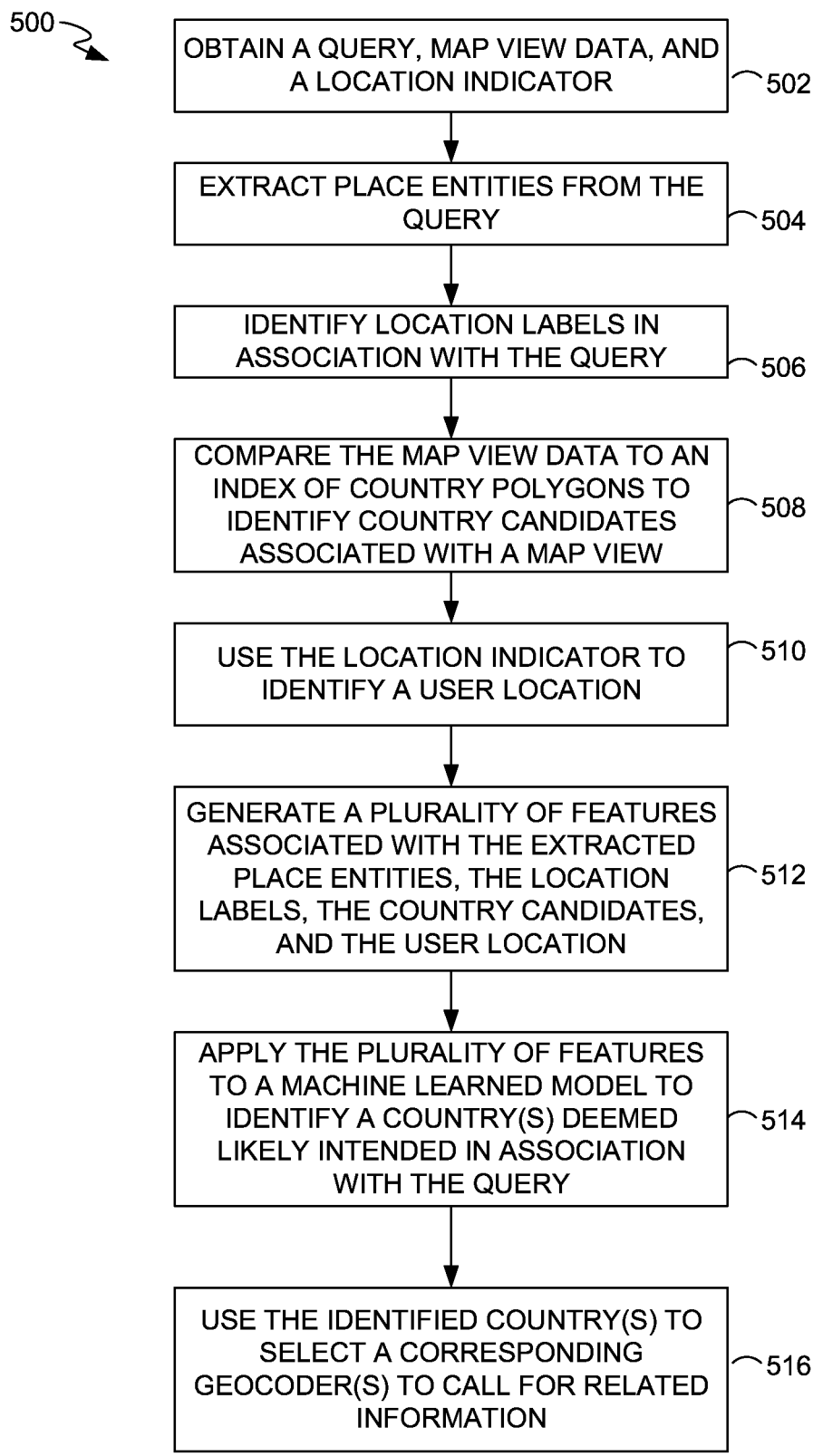
FIG. 5 depicts a flow diagram of a method for determining the probability of suggested intended countries associated with a query, in accordance with an aspect of the technology.

Turning now to FIG. 5, a flow diagram is provided illustrating one example method 500 for determining the probability of suggested intended countries associated with a query. Each block or step of method 500 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Initially, at block 502, a query, map view data, and a location indicator are obtained. At block 504, place entities are extracted from the query. At block 506, location labels are identified in association with the query. At block 508, the map view data is compared to an index of country polygons to identify country candidates associated with a map view presented to a user. Country candidates may be determined by identifying intersections between the map view data and the location polygons in the index of the location polygons. At block 510, the location indicator is used to identify a user location of the user. Thereafter, at block 512, a plurality of features associated with the extracted place entities, the location labels, the country candidates, and the user location are generated. In embodiments, the features represent the various location signals in a normalized manner. At block 514, the plurality of features are applied to a machine learned model to identify a country(s) deemed likely intended in association with the query. At block 516, the identified country(s) can be used to select a corresponding geocoder(s) to call for related information.

Figure 6:
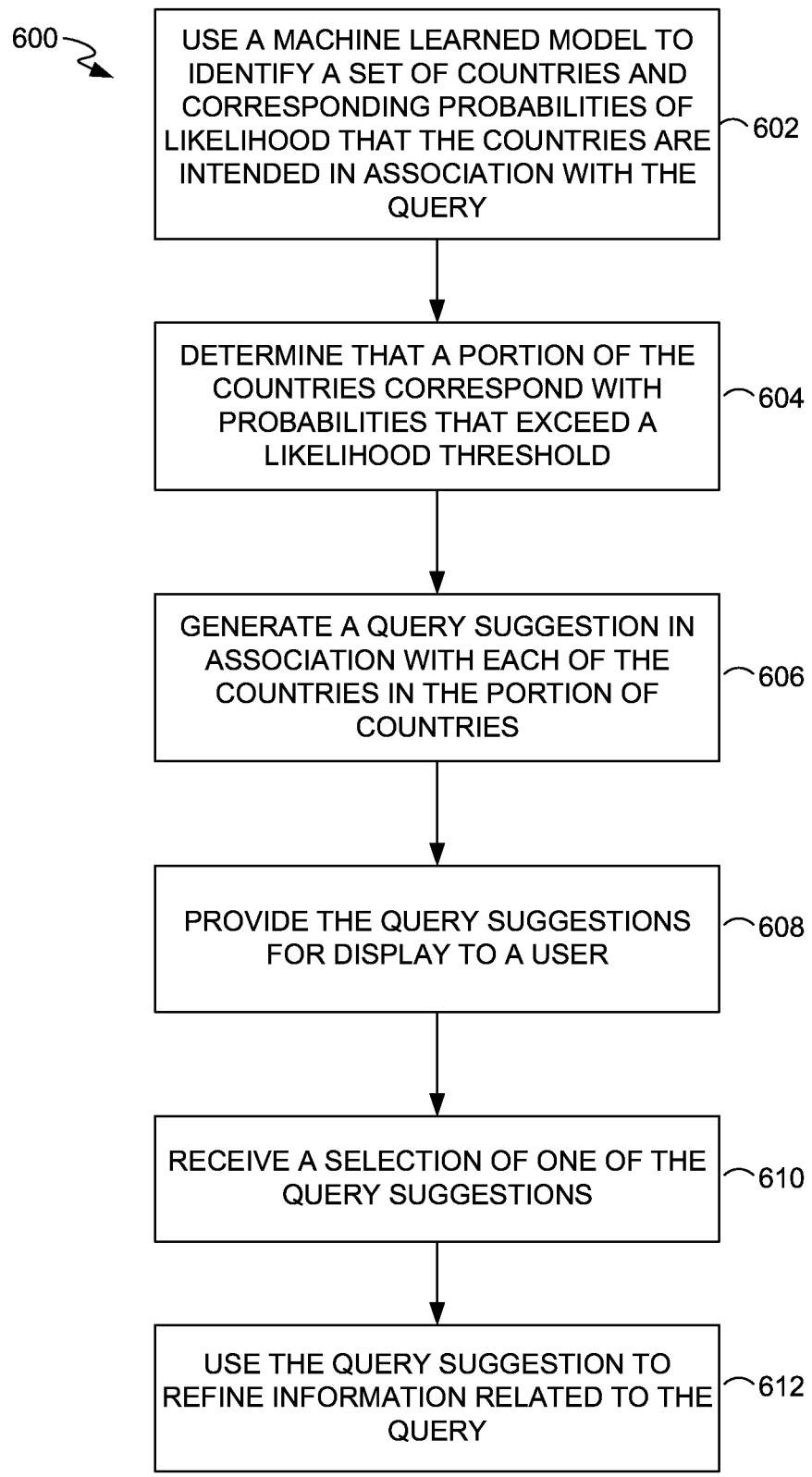
FIG. 6 depicts a flow diagram of a method for determining the predicted country associated with a query and providing the predicted country, in accordance with an aspect of the technology.

Turning now to FIG. 6, a flow diagram is provided illustrating one example method 600 for identifying a predicted country(s) associated with a query, in accordance with embodiments described herein. Each block or step of method 600 and other methods described herein comprises a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a stand-alone application, a service or hosted service (stand-alone or in combination with another hosted service), or a plug-in to another product, to name a few.

Initially, at block 602, a machine learned model is used to identify a set of countries and corresponding probabilities of likelihood that the countries are intended in association with the query. The machine learned model can utilize various features including features generated from place entities, location labels, location candidates, and/or user location. At block 604, it is determined that a portion of the countries correspond with probabilities that exceed a likelihood threshold. At block 606, a query suggestion is generated in association with each of the countries in the portion of countries that correspond with probabilities that exceed a likelihood threshold. For example, assume a likelihood threshold is 35%. Further assume that a first country is identified as having a 45% likelihood of intent and a second country is identified as having a 40% likelihood of intent. In such a case, a query suggestion associated with the first country can be generated and a query suggestion associated with the second country can be generated. As can be appreciated, the query suggestion can be any type of suggestion, including a simple recitation of the identified location or country. At block 608, the query suggestions are provided for display to a user. At block 610, a selection of one of the query suggestions is received. Thereafter, at block 612, the query suggestion, including the related country, can be used to refine information related to the query. For example, assume a user selects a first listed country. In such a case, a call can be executed to the geocoder that corresponds with the first listed country.

Figure 7:
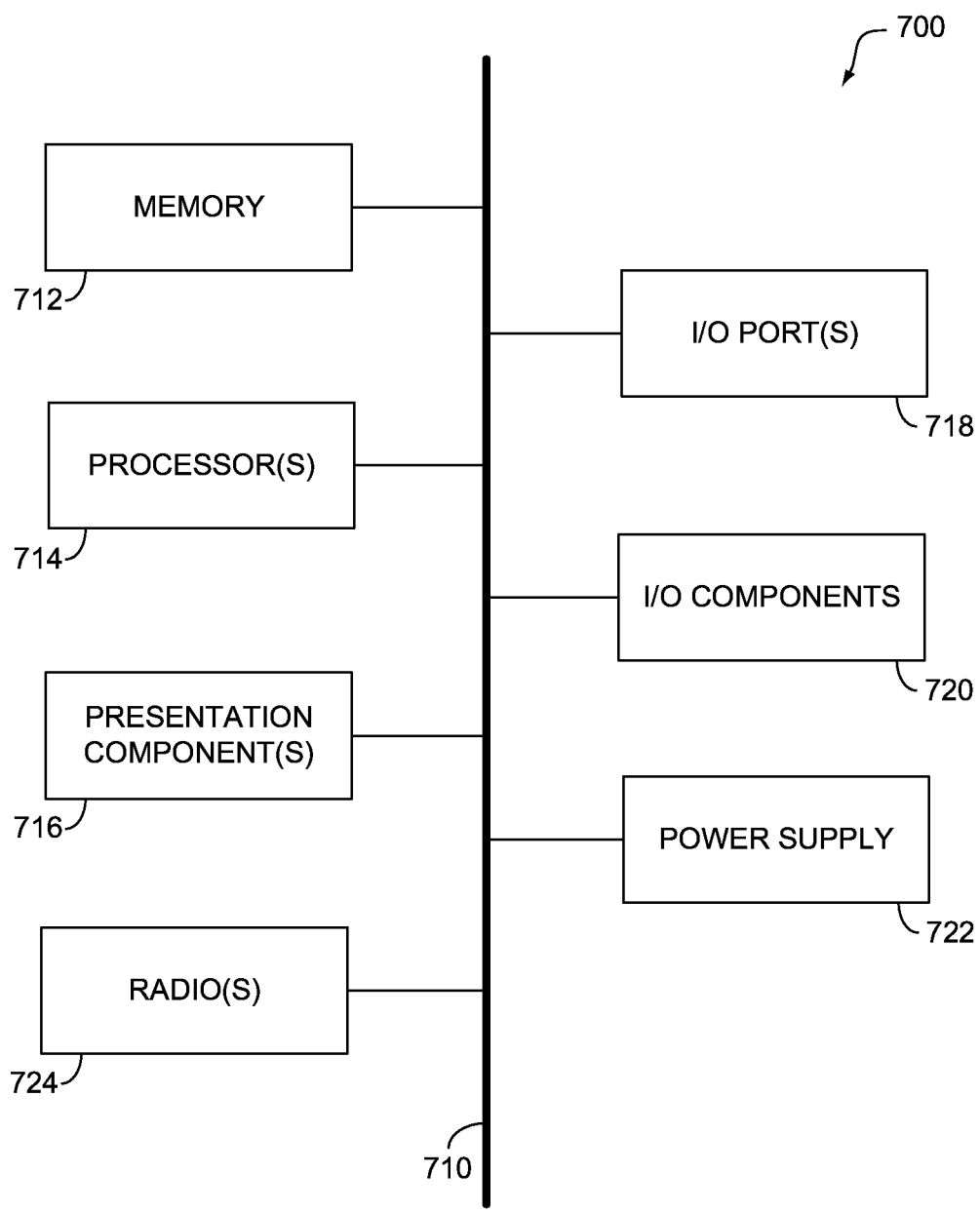
FIG. 7 is a block diagram of an exemplary computing environment suitable for use in implementing an aspect of the technology.

With reference to FIG. 7, computing device 700 includes a bus 710 that directly or indirectly couples the following devices: memory 712, one or more processors 714, one or more presentation components 716, one or more input/output (I/O) ports 718, one or more I/O components 720, and an illustrative power supply 722. Bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 7 is merely illustrative of an exemplary computing device that can be used in connection with one or more aspects of the present technology. Distinction is not made between such categories as "workstation," "server," "laptop," "handheld device," etc., as all are contemplated within the scope of FIG. 7 and with reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer-storage media and communication media.

Computer-storage media includes both volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 presents data indications to a user or other device. Exemplary presentation components include a display device, speaker, printing component, vibrating component, and the like.

The I/O ports 718 allow computing device 700 to be logically coupled to other devices, including I/O components 720, some of which may be built in. Illustrative components include a microphone, joystick, game pad, satellite dish, scanner, printer, wireless device, etc.

The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

Some aspects of computing device 700 may include one or more radio(s) 724 (or similar wireless communication components). The radio 724 transmits and receives radio or wireless communications. The computing device 700 may be a wireless terminal adapted to receive communications and media over various wireless networks. Computing device 700 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Aspects of the present technology have been described with the intent to be illustrative rather than restrictive. Alternative aspects will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. One or more computer storage media that, when executed by a computing device, causes the computing device to perform a method for determining countries associated with queries, the method comprising:
obtaining a user search query and associated map view data;
identifying from the user search query (i) a set of place entities that each indicate a location and (ii) a set of location labels that each indicate an aspect of a corresponding location;
identifying, by comparing the map view data to an index of country polygons, a set of country candidates;
obtaining a feature set generated by normalizing the set of place entities, the set of location labels, and the set of country candidates;
ranking the set of country candidates using the feature set; and
providing at least the top ranked country of the ranked set of countries to a search engine for use along with the user search query for searching for relevant information.

2. The media of claim 1, wherein the method further comprises receiving the query from a user device.

3. The media of claim 1, wherein identifying the set of place entities from the query comprises scanning the query for a token that matches an entity token in an index.

4. The media of claim 1, wherein identifying the set of location labels from the query comprises using conditional random fields to determine a probability that one or more tokens from the query corresponds with a pattern.

5. The media of claim 1, wherein the method further comprises identifying a user location and applying the user location to a machine learned model to identify the set of countries likely intended in association with the query.

6. The media of claim 1, wherein the map view data indicates coordinates that correspond with a plurality of corners of the map view.

7. The media of claim 1, wherein the index of country polygons comprises an R-tree structure.

8. The media of claim 1, wherein normalizing the set of place entities, the set of location candidates, and the set of location labels comprises converting the set of place entities, the set of location candidates, and the set of location labels to one of a number, a number vector, or confidence score.

9. The media of claim 1, wherein providing the at least the top ranking country of the ranked set of countries to a search engine comprises executing a call to each geocoder associated with the at least the top ranking country of the ranked set of countries.

10. The media of claim 1, wherein providing the at least the top ranking country of the ranked set of countries to a search engine comprises providing candidate query rewrite suggestions for the at least the top ranking country of the ranked set of countries.

11. The media of claim 1, wherein the at least the top ranking country of the ranked set of countries exceed a threshold of likelihood of being intended or exceed a similarity threshold of being intended.

12. The media of claim 1, wherein the at least two top ranked countries of the ranked set of countries is validated by a user.

13. A method for determining countries associated with queries, the method comprising:
obtaining a user search query and associated map view data;
identifying from the user search query, (i) a set of place entities that each indicate a location and (ii) a set of location labels that each indicate an aspect of a corresponding location;
identifying by comparing the map view data to an index of country polygons, a set of country candidates;
obtaining a feature set generated by normalizing the set of place entities, the set of location labels, and the set of country candidates;
identifying a user location;
ranking the set of country candidates using the feature set and the identified user location; and
providing at least the top ranked country of the ranked set of countries to a search engine to be used along with the user search query to search for relevant information.

14. The method of claim 13, wherein identifying the set of place entities from the query comprises scanning the query for a token that matches an entity token in an index.

15. The method of claim 13, wherein identifying the set of location labels from the query comprises using conditional random fields to determine a probability that one or more tokens from the query corresponds with a pattern.

16. The method of claim 13, wherein the index of country polygons comprising an R-tree structure.

17. The method of claim 13, wherein the set of features are a normalized set of features.

18. One or more computer storage media that, when executed by a computing device, causes the computing device to perform a method determining countries associated with queries, the method comprising:
   obtaining a user search query and associated map view data;
   identifying from the user search query,
   (i) a set of place entities that each indicate a location and
   (ii) a set of location labels that each indicate an aspect of a corresponding location;
   identifying by comparing the map view data to an index of country polygons, a set of country candidates;
   obtaining a feature set generated by normalizing the set of place entities, the set of location labels, and the set of country candidates;
   ranking the set of country candidates using the feature set; and
   providing a query suggestions of at least two top ranked countries of the ranked set of countries for use along with the user search query for searching for relevant information.

19. The media of claim 18, wherein at least two top ranked countries of the ranked countries exceed a threshold.

20. The media of claim 18, wherein the query suggestions are presented via a graphical user interface within a search results page or via a virtual assistant in an audio format.

* * * * *